US011769527B2

(12) United States Patent
Seigler et al.

(10) Patent No.: US 11,769,527 B2
(45) Date of Patent: Sep. 26, 2023

(54) HEAT-ASSISTED MAGNETIC RECORDING HEAD NEAR-FIELD TRANSDUCER WITH A HEAT SINK

(71) Applicant: Seagate Technology LLC, Fremont, CA (US)

(72) Inventors: Michael A Seigler, Eden Prairie, MN (US); Tae-Woo Lee, Eden Prairie, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/807,252

(22) Filed: Jun. 16, 2022

(65) Prior Publication Data

US 2022/0415353 A1 Dec. 29, 2022

Related U.S. Application Data

(60) Provisional application No. 63/216,450, filed on Jun. 29, 2021.

(51) Int. Cl.
| | | |
|---|---|---|
| *G11B 11/10* | (2006.01) | |
| *G11B 13/08* | (2006.01) | |
| *G11B 5/012* | (2006.01) | |
| *G11B 5/00* | (2006.01) | |

(52) U.S. Cl.
CPC .............. *G11B 13/08* (2013.01); *G11B 5/012* (2013.01); *G11B 2005/0021* (2013.01)

(58) Field of Classification Search
CPC . G11B 13/08; G11B 5/012; G11B 2005/0021; G11B 5/4866; G11B 5/6088; G11B 11/105; G11B 11/10
USPC .......................................................... 360/59
See application file for complete search history.

(56) References Cited

U.S. PATENT DOCUMENTS

| | | |
|---|---|---|
| 9,626,991 B2 | 4/2017 | Chen et al. |
| 9,728,209 B2 | 8/2017 | Chen et al. |
| 10,490,214 B1 | 11/2019 | Chen |
| 10,490,221 B1 | 11/2019 | Chen |
| 10,916,262 B1 | 2/2021 | Janjua et al. |
| 2013/0343167 A1* | 12/2013 | Zou .................... G11B 13/08 369/13.33 |
| 2021/0027808 A1 | 1/2021 | Matsumoto et al. |
| 2021/0027809 A1 | 1/2021 | Habibi et al. |

FOREIGN PATENT DOCUMENTS

WO    2016191707 A1    12/2016

* cited by examiner

*Primary Examiner* — Nabil Z Hindi

(57) ABSTRACT

A heat-assisted magnetic recording head includes a near-field transducer (NFT). The NFT includes a near-field emitter configured to heat a surface of a magnetic disk, and a heat sink. The heat sink includes at least one of rhodium, copper, tungsten, tantalum, iridium, platinum, ruthenium, nickel, or iron.

19 Claims, 3 Drawing Sheets

HEAT-ASSISTED MAGNETIC RECORDING HEAD NEAR-FIELD TRANSDUCER WITH A HEAT SINK

This application claims priority to U.S. Provisional Patent Application Ser. No. 63/216,450, entitled "HEAT-ASSISTED MAGNETIC RECORDING HEAD NEAR-FIELD TRANSDUCER WITH A HEAT SINK" and filed Jun. 29, 2021, the entire contents of which are hereby incorporated by reference.

TECHNICAL FIELD

The disclosure relates to a near-field transducer for a heat-assisted magnetic recording head of a hard disk drive.

BACKGROUND

Some hard disk drives (HDDs) utilize heat-assisted magnetic recording (HAMR) to increase the areal density of the HDD. A recording head of a HAMR HDD typically includes a laser, a near-field transducer (NFT) configured to briefly heat a small hot spot on a surface of a magnetic disk of the HDD, and a write pole configured to write data to the magnetic disk in the vicinity of the hot spot. The process of generating and condensing localized surface plasmons (LSPs) on the NFT to produce the hot spot generates enormous amounts of heat which may degrade and/or deform various components of the NFT, thus potentially reducing the performance and/or life expectancy of the HAMR head and the HDD.

SUMMARY

The present disclosure describes a heat-assisted magnetic recording (HAMR) head having a near-field transducer (NFT) that includes a thermally stable heat sink. The heat sink includes rhodium, copper, tungsten, tantalum, iridium, platinum, ruthenium, and/or a nickel-iron alloy. The heat sink may be disposed near a portion of the NFT which is coupled to one or more features configured to dissipate heat away from the NFT, such as near a diffuser or another heat sink. Utilizing a heat sink that includes rhodium, copper, tungsten, tantalum, iridium, platinum, ruthenium, and/or a nickel-iron alloy may increase the thermal robustness of the HAMR head.

In one example, a heat-assisted magnetic recording head includes a near-field transducer including a near-field emitter configured to heat a surface of a magnetic disk; and a heat sink including at least one of rhodium, copper, tungsten, tantalum, iridium, platinum, ruthenium, nickel, or iron.

In one example, a heat-assisted magnetic recording head includes a near-field transducer including a near-field emitter configured to heat a surface of a magnetic disk; and a heat sink including rhodium.

These and other features and aspects of various examples may be understood in view of the following detailed discussion and accompanying drawings.

DETAILED DESCRIPTION

Figure 1:
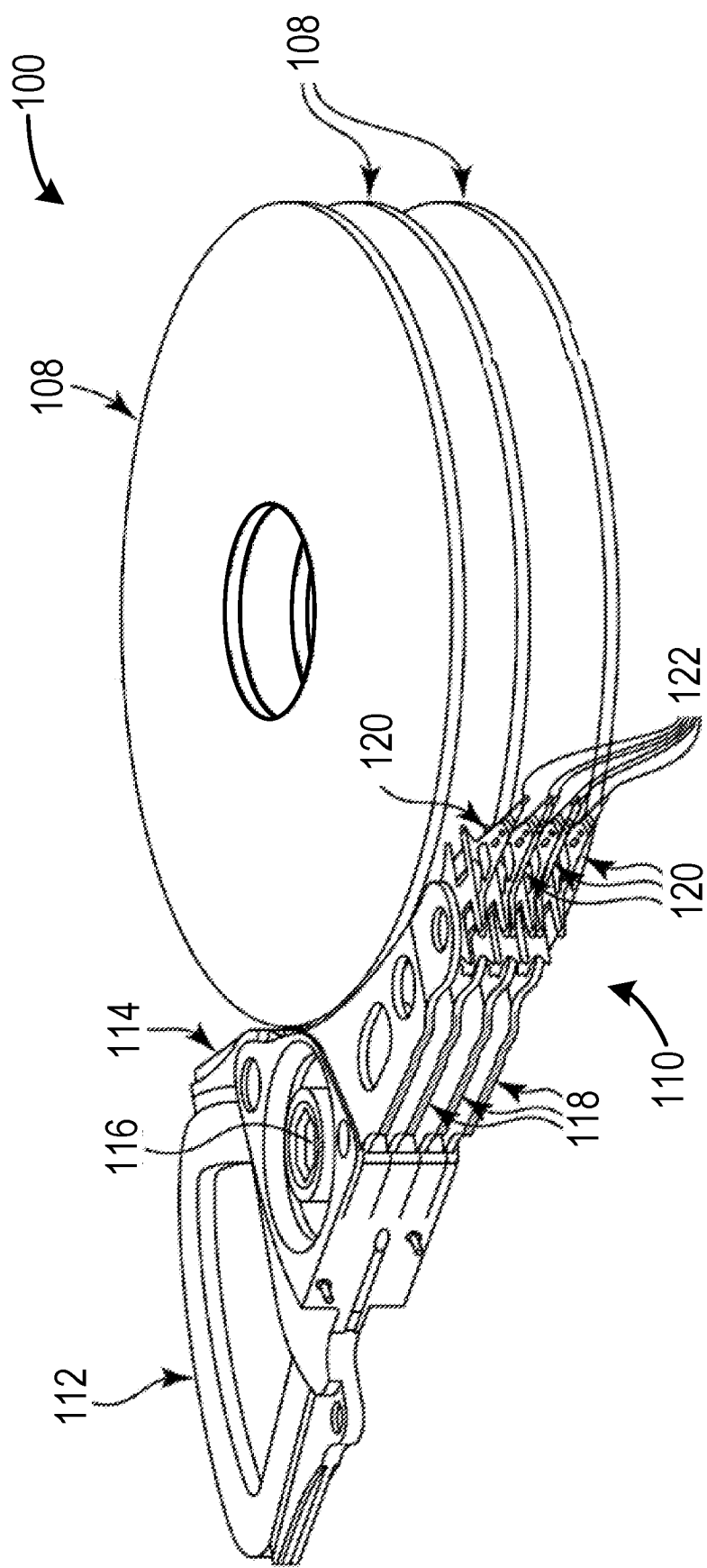
FIG. 1 is a perspective view of an example hard disk drive, in accordance with aspects of this disclosure.

FIG. 1 is a perspective view of an example heat assisted magnetic recording (HAMR) hard disk drive (HDD), in accordance with aspects of this disclosure. HDD 100 includes a head stack assembly (HSA) 110 and one or more magnetic disks 108. HSA 110 includes a plurality of head gimbal assemblies (HGA) 120. Each HGA 120 includes a slider 122. Each slider 122 includes a heat-assisted magnetic recording (HAMR) head configured to read data from and write data to a surface of a respective magnetic disk 108. In one example, each HAMR head includes a writer, a reader, a heater (e.g., a reader heater, a writer heater), and a near-field transducer (NFT).

HSA 110 of FIG. 1 includes a voice coil drive actuator 112. Voice coil drive actuator 112 produces a magnetic field which exerts a force on an actuator mechanism 114, causing actuator mechanism 114 to rotate about a shaft 116 in either rotational direction. Rotatable drive actuator arms 118 are mechanically coupled to actuator mechanism 114 and to each HGA 120 such that rotating actuator mechanism 114 causes rotatable drive actuator arms 118 and HGAs 120, and thus sliders 122, to move relative to magnetic disks 108.

Figure 2:
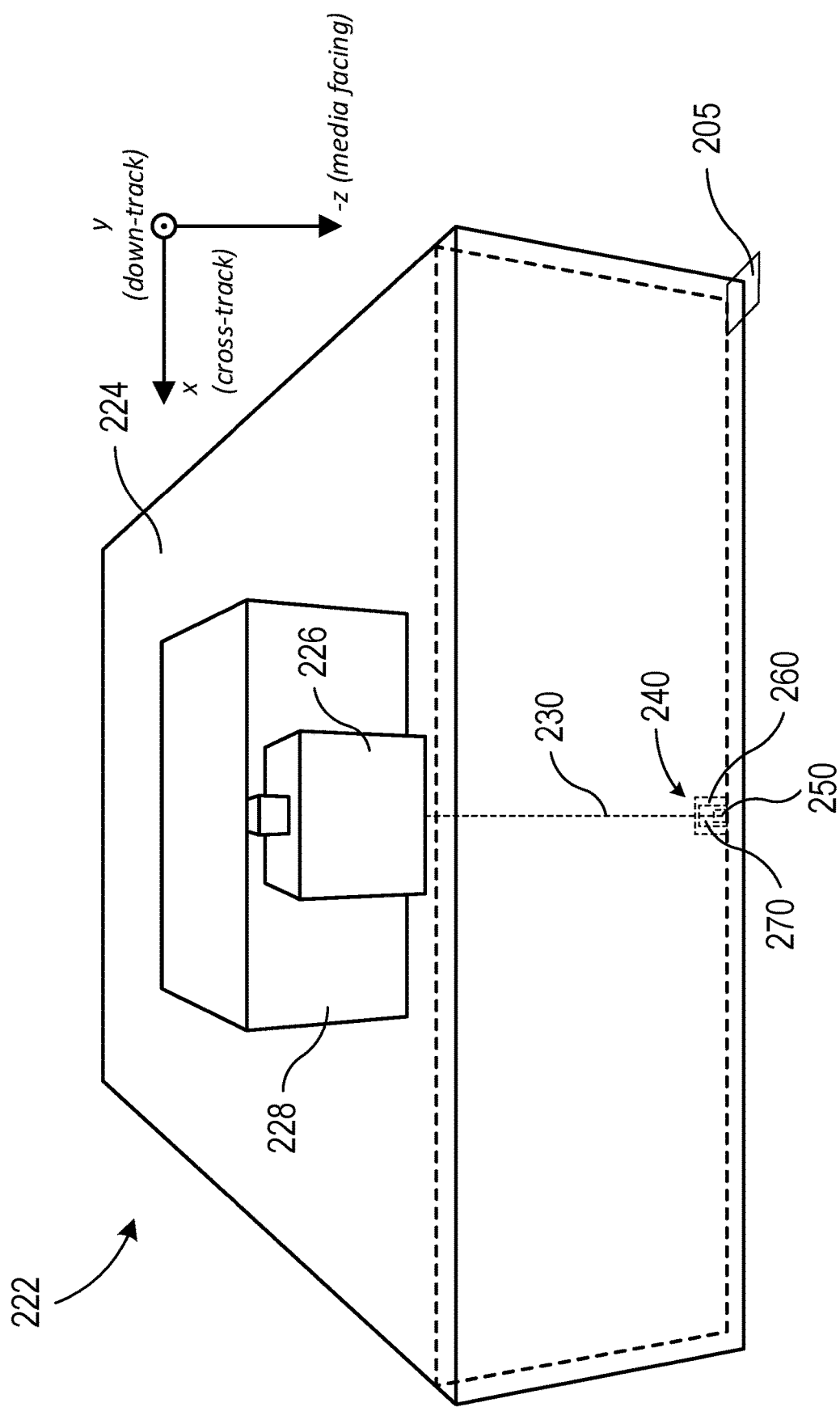
FIG. 2 is a perspective view of an example slider, in accordance with aspects of this disclosure.

FIG. 2 is a perspective view of an example slider 222, in accordance with aspects of this disclosure. Slider 222 may be an example of slider 122 of FIG. 1. Slider 222 includes a slider body 224, a laser 226, a submount 228, and a HAMR head 240. HAMR head 240 includes a waveguide 230, a near-field transducer (NFT) 250, a writer 260, and a reader 270. In the example of FIG. 2, some features or parts of features of NFT 250, writer 260, and reader 270 are presented on a media-facing air-bearing surface (ABS) 205 that is positioned over a surface of a magnetic disk (not shown) during some operations of the HDD (e.g., write operations, read operations, data maintenance operations). During such operations, ABS 205 faces and is held proximate to the moving magnetic disk surface by a cushion of gas, known as an active air bearing (AAB), that is produced from a dynamic flow of gas across a pattern of recessed sub-surfaces bound within the volume of slider body 224 by ABS 205.

Laser 226 is configured to emit photons of a target wavelength. In some examples, laser 226 emits photons with a wavelength in the near infrared range (e.g., approximately 830 nm) or visible range. Examples of laser 226 include an optically pumped semiconductor laser, a quantum well laser, an integrated laser, or other suitable laser. Laser 226 of this example may be configured as an edge emitting laser (EEL), vertical cavity surface emitting laser (VCSEL), or other type of laser. Other example HAMR heads may include other types of light sources such as light emitting diodes (LEDs) and surface emitting diodes.

Laser 226 is coupled to slider body 224 via submount 228. In the example of FIG. 2, laser 226 and submount 228 are located on a face of slider body 224 which is opposite to ABS 205. In other example HAMR sliders, a laser may be directly mounted to the slider body. Submount 228 may be configured to redirect photons output from laser 226 so that the photons are directed into waveguide 230 in the negative z-direction of FIG. 2 (e.g., toward NFT 250). The path between laser 226 and waveguide 230 may include one or more optical couplers, mode converters, and/or mode couplers. Waveguide 230 is formed integrally within slider body 224 and is configured to deliver photons from laser 226 to NFT 250.

NFT 250 is configured to create a small hot spot on a magnetic disk. For example, NFT may generate and support a distribution of localized surface plasmons (LSPs) upon receiving incident photons from laser 226 by way of waveguide 230 and may condense the LSP distribution on an area or feature of NFT 250. NFT 250 amplifies a near-field of the condensed LSP distribution and focuses the near-field toward a surface of a magnetic disk (e.g., a magnetic disk 108 of FIG. 1) to produce a hot spot. Writer 260 is configured to generate a magnetic field from an electrical current and aim the magnetic field at the hot spot on the magnetic disk. The near-field energy heats and lowers the coercivity of the magnetic grains in the hot spot, thereby enabling magnetic moments of these magnetic grains to be oriented by the magnetic field generated by writer 260. Turning off laser 226 or moving NFT 250 toward a different location of the magnetic disk (or moving the magnetic disk such that NFT 250 faces a different location of the magnetic disk) removes the focused near-field energy from the hot spot. Removing the near-field energy allows the magnetic grains contained in the spot to cool. The cooling locks in the magnetic moment orientation induced by the magnetic field generated by writer 260, thus preserving the bits of written data.

Figure 3:
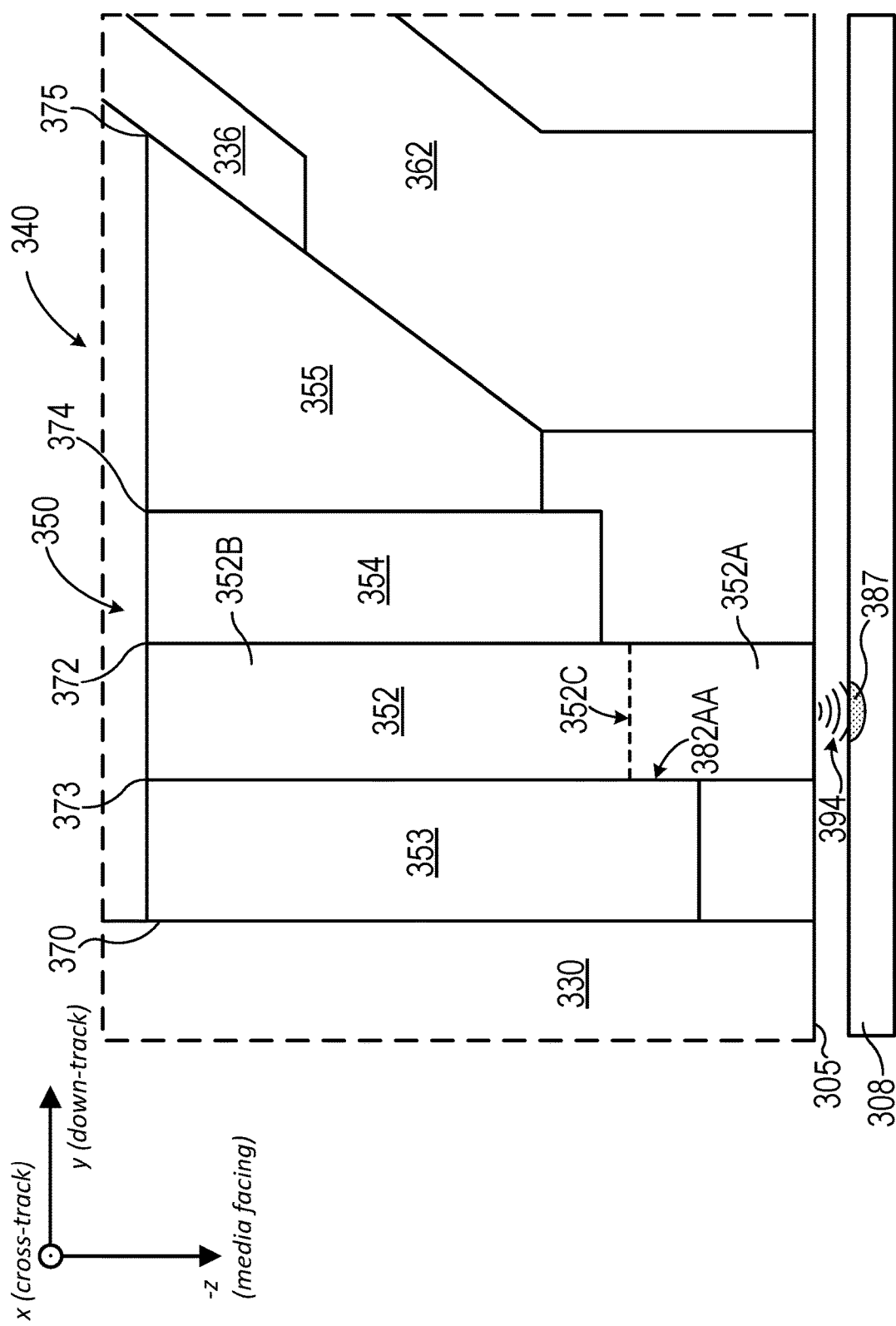
FIG. 3 is a cross-sectional view of an example HAMR head, in accordance with aspects of this disclosure.

FIG. 3 is a cross-sectional view of an example HAMR head, in accordance with aspects of this disclosure. HAMR head 340 includes a waveguide 330, an NFT 350, a write pole 362, and a diffuser 336.

A light source, such as laser 226 of FIG. 2, emits photons of a target wavelength range (e.g., near infrared, visible). In some instances, laser 226 emits a distribution of photons with a median wavelength of approximately 800 nm to approximately 900 nm. Waveguide 330 is configured to support LSP generation on NFT 350 by directing photons from the light source toward NFT 350. In some examples, a waveguide includes at least two layers that include different materials. Waveguide 330, for example, may include a waveguide core and a core-to-NFT spacing (CNS) layer. In one example, a material of a first layer has a refractive index that is different than the refractive index of a material of a second layer. In some examples, the momentum of an incident photon in a first material is shifted upon transmission into a second material, which may be caused by the difference in the refractive indices of the materials of the first and second layers.

LSPs are generated on NFT 350 through resonance coupling of photons from the light source with free electrons of NFT 350. NFT 350 is configured to condense LSPs of NFT 350, amplify a near field of the LSPs, and emit a near-field 394 to produce a hot spot 387 on a magnetic disk 308. Near-field 394 and a magnetic field from write pole 362 are directed to be partially coincident on spot 387 such that the temperature increase resulting from near-field 394 reduces the magnetic coercivity of the grains within hot spot 387 and enables the magnetic field from write pole 362 to orient magnetic moments of the grains more easily, thus producing more stable bits of written data upon cooling.

NFT 350 includes a near-field emitter 352. Near-field emitter 352 is configured to emit near-field 394 to produce hot spot 387 on magnetic disk 308. Near-field emitter 352 may include a peg 352A and a disk 352B. Peg 352A is disposed near an air-bearing surface 305 of HAMR head 340. In some instances, one or more portions of peg 325A are exposed on air-bearing surface 305. In some examples, disk 352B is coupled to peg 352A and is disposed behind peg 352B relative to air-bearing surface 305 (e.g., in the z-direction). Disk 352B is configured to serve as an anchor for peg 352A. Peg 352A may be narrower in profile than disk 352B. In some examples, near-field emitter 352 is a single feature, with peg 352A and disk 352B being two regions of a continuous piece. In these examples, near-field emitter 352 may taper or narrow toward peg 352A. Peg 352A may protrude from disk 352B in the vicinity of air-bearing surface 305.

In other examples, peg 352A and disk 352B are separate, discrete features separated by a defined interface 352C. In examples where peg 352A and disk 352B are two regions of a continuous piece, peg 352A and disk 352B may include the same material(s). For example, peg 352A and disk 352B may both include iridium, rhodium, ruthenium, or a gold alloy. In some examples, peg 352A and disk 352B include different materials (e.g., different elements, different alloys, different composites). For example, peg 35A may include iridium, ruthenium, a gold alloy, or a gold composite, and disk 352B may include gold or a different gold alloy or gold composite than peg 352A (e.g., a gold alloy with a different alloying metal, a gold alloy with a different concentration of the same alloying metal that peg 352A includes).

Disk 352B is configured to receive and support a distribution of LSPs. In some examples, disk 352B is configured to participate in LSP generation. Peg 352A is configured to emit near-field 394 to generate hotspot 387 on magnetic disk 308. For example, peg 352A may generate hotspot 387 by receiving and condensing a distribution of LSPs, amplifying a near-field of the LSP distribution, and emitting amplified near-field 394 toward the surface of magnetic disk 308.

NFT 350 includes a plasmonic disk 353. Plasmonic disk 353 is configured to generate and support LSPs through resonance coupling with incident photons which are generated by a light source (e.g., laser 226 of FIG. 2) and are directed toward NFT 350 by waveguide 330.

Plasmonic disk 353 may include a more thermally robust material relative to plasmonic disks of other HAMR heads. Examples of thermally robust materials include rhodium, iridium, and alloys comprising rhodium, iridium, gold, silver, copper, and/or aluminum. An alloy of plasmonic disk 353 may include rhodium, iridium, gold, silver, copper, and/or aluminum as a primary material (e.g., a material that constitutes a majority of the composition of plasmonic disk 353), and one or more alloying metals. In some examples, the inclusion of an alloying metal in a primary material of plasmonic disk 353 improves the thermal robustness of plasmonic disk 353 (e.g., by impeding defect formation and migration, by stabilizing grain size). Examples of alloying metals include rhodium, copper, tungsten, tantalum, iridium, rhodium, and platinum, nickel, bismuth, indium, tin, manganese, holmium, lutetium, praseodymium, scandium, uranium, barium, cesium, dysprosium, europium, rubidium, terbium, gadolinium, samarium, thallium, cadmium, neodymium, lead, hafnium, niobium, erbium, magnesium, palladium, vanadium, zinc, chromium, iron, lithium, sodium, strontium, calcium, yttrium, thorium, beryllium, thulium, ytterbium, promethium, neodymium, cobalt, cerium, and lanthanum.

NFT 350 may include a middle disk (MDSC) 354. MDSC 354 is configured to direct LSPs toward an emitting region of a respective near-field emitter 352 and/or mitigate background fields. MDSC 354 may include a thermally conductive material (e.g., gold) and/or a thermally stable material (e.g., iridium, rhodium).

NFT 350 includes a heat sink 355. Heat sink 355 is configured to draw heat away from regions of NFT 350 and direct the heat toward other regions of HAMR head 340. In the example of HAMR head 340, heat sink 355 is coupled to diffuser 336. Diffuser 336 is a heat sink that is configured to draw heat from NFT 350 and dissipate the heat toward other areas of HAMR head 340 (e.g., toward other heat sinks). Diffuser 336 may include a thermally conductive material (e.g., gold). Heat sink 355 may draw heat away from other features of NFT 350 (e.g., from near-field emitter 352, from plasmonic disk 353) and dissipate it toward other features (e.g., diffuser 336). In some examples, drawing heat away from regions of NFT 350 which are prone to thermal degradation may reduce defect formation and/or extend the operating lifetime of HAMR head 340.

In accordance with aspects of this disclosure, heat sink 355 includes at least one thermally stable material. Examples of thermally stable materials include rhodium, copper, tungsten, tantalum, iridium, platinum, ruthenium, nickel, and/or iron. A concern with heat sink integrity in an NFT is volume loss resulting from prolonged thermal exposure, which may reduce the effectiveness of heat dissipation over the lifetime of a HAMR head. Including one or more thermally stable materials in heat sink 355 may improve the ability of the heat sink to dissipate heat more effectively and/or consistently and may extend the lifetime of HAMR head 340. In some examples, including one or more thermally stable materials in heat sink 355 may improve its resistance to thermal defects such as voiding, deformation, recession, and/or delamination from other surrounding features. Reducing the occurrence of these defect modes may improve the performance and/or prolong the lifetime of an associated. HAMR head by providing sufficient heat dissipation to maintain lower operating temperatures in thermally sensitive regions and features of the NFT.

In some examples, rhodium, copper, tungsten, tantalum, iridium, platinum, ruthenium, nickel, and/or iron are included in heat sink 355 as a primary material (e.g., a material that constitutes most, at least 50 percent, or all of the composition of heat sink 355). In some examples, heat sink 355 includes an alloy. Rhodium, copper, tungsten, tantalum, iridium, platinum, ruthenium, nickel, and/or iron may be included in heat sink 355 as a primary material of an alloy (e.g., one that makes up most, at least 50 percent, of the alloy composition). For example, an alloy of heat sink 355 may include a thermally stable material as a primary material and one or more alloying metals (e.g. copper alloyed with zinc, nickel alloyed with iron). An alloying metal may provide the alloy, and thus heat sink 355, with improved thermal stability over a primary material alone (e.g., a higher melting temperature, a more thermally stable phase, more stable grain size). Including an alloy in heat sink 355 may thus increase its thermal stability over some heat sinks which do not include an alloy. Examples of alloying metals include rhodium, copper, tungsten, tantalum, iridium, platinum, ruthenium, nickel, bismuth, indium, tin, manganese, holmium, lutetium, praseodymium, scandium, uranium, barium, cesium, dysprosium, europium, rubidium, terbium, gadolinium, samarium, thallium, cadmium, neodymium, lead, hafnium, niobium, erbium, magnesium, palladium, vanadium, zinc, chromium, iron, lithium, sodium, strontium, calcium, yttrium, thorium, beryllium, thulium, ytterbium, promethium, neodymium, cobalt, cerium, lanthanum, and combination thereof.

In some examples, heat sink 355 includes a thermally stable material as an alloying metal (e.g., at least one of rhodium, copper, tungsten, tantalum, iridium, platinum, ruthenium, nickel, or iron). For example, heat sink 355 may include a thermally conductive material (e.g., gold) as a primary material and a thermally stable material as an alloying metal (e.g., gold alloyed with rhodium).

In some examples, heat sink 355 includes a composite (e.g., a dispersion of a primary material and a secondary material). Including a composite in heat sink 355 may increase its thermal stability. A composite may include a thermally stable material as a primary material and may further include one or more secondary materials. A secondary material may be included to improve thermal resistance (e.g., by impeding defect formation and migration, by stabilizing grain size). Examples of a secondary material includes nanoparticles (e.g., yttrium oxide nanoparticles, transparent conductive oxide (TCO) nanoparticles such as zinc oxide nanoparticles). For example, heat sink 355 may include rhodium as a primary material with dispersed yttrium oxide and/or zinc oxide nanoparticles as a secondary material.

Heat sink 355 is disposed down track from near-field emitter 352 along an axis which is substantially parallel to air-bearing surface 305 (e.g., the down-track y-axis). A surface of heat sink 355 may be coupled to a surface of diffuser 336 at an interface 375. A second surface of diffuser 336 may be coupled to a surface of write pole 362. The surface of heat sink 355 may be coupled to the surface of write pole 362. In some examples, the surface of heat sink 355 includes at least one of rhodium, copper, tungsten, tantalum, iridium, platinum, ruthenium, nickel, or iron. Coupling heat sink 355 to diffuser 336 and/or write pole 362 may, in some scenarios, provide heat dissipation to extend the lifetime of NFT 350. Including a thermally stable material in heat sink 355 may enable it to dissipate heat to diffuser 336 and/or write pole 362 more efficiently. This may improve the thermal stability of heat sink 355 and may preserve the shape and/or volume of heat sink 355. Preserving the shape and/or volume of heat sink 355 may enable heat sink 355 to maintain efficient heat dissipation away from NFT 350 over the lifetime of HAMR head 340.

Heat sink 335 and middle disk 354 are coupled to each other at an interface 375. Interface 375 may be substantially orthogonal to air-bearing surface 305. Interface 375 includes a surface of middle disk 354 and a second surface of heat sink 355 that is different than the surface of heat sink 355 that is coupled to diffuser 336 and/or write pole 362. In some examples, the second surface of heat sink 355 includes at least one of rhodium, copper, tungsten, tantalum, iridium, platinum, ruthenium, nickel, or iron.

Middle disk 354 and near-field emitter 352 are coupled to each other at an interface 374. Interface 374 may be substantially orthogonal to air-bearing surface 305. Interface includes a surface of near-field emitter 352 and a second surface of middle disk 354 that is different than the surface of middle disk 354 that is coupled to heat sink 355.

Near-field emitter 352 and plasmonic disk 353 are coupled to each other at an interface 373. Interface 373 may be substantially orthogonal to air-bearing surface 305. Interface 373 includes a surface of plasmonic disk 353 and a second surface of near-field emitter 352 that is different than the surface of near-field emitter 352 that is coupled to middle disk 354.

Plasmonic disk 353 and waveguide 330 are coupled to each other at an interface 370. Interface 370 may be substantially orthogonal to air-bearing surface 305. Interface 370 includes a surface of waveguide 330 and a second surface of plasmonic disk 353 that is different than the surface of plasmonic disk 353 that is coupled to near-field emitter 352.

What is claimed is:

1. A heat-assisted magnetic recording head comprising a near-field transducer comprising:
   a plasmonic disk;
   a near-field emitter configured to heat a surface of a magnetic disk; and
   a heat sink comprising at least one of rhodium, copper, tungsten, tantalum, iridium, platinum, ruthenium, nickel, or iron,
   wherein the near-field emitter is disposed between the plasmonic disk and the heat sink in a down-track dimension of the heat-assisted magnetic recording head, and
   wherein the near-field emitter and the plasmonic disk are coupled to each other at an interface comprising a surface of the plasmonic disk and a surface of the near-field emitter.

2. The heat-assisted magnetic recording head of claim 1, wherein the at least one of rhodium, copper, tungsten, tantalum, iridium, platinum, ruthenium, nickel, or iron is an alloying metal of an alloy of the heat sink.

3. The heat-assisted magnetic recording head of claim 1, wherein the heat sink is disposed down track from the near-field emitter along an axis which is substantially parallel to an air-bearing surface of the heat-assisted magnetic recording head.

4. The heat-assisted magnetic recording head of claim 1 comprising a diffuser,
   wherein a surface of the heat sink is coupled to a surface of the diffuser.

5. The heat-assisted magnetic recording head of claim 4 comprising a write pole,
   wherein the surface of the diffuser is a first surface of the diffuser, and
   wherein a second surface of the diffuser is coupled to a surface of the write pole.

6. The heat-assisted magnetic recording head of claim 5, wherein the surface of the heat sink is coupled to the surface of the write pole.

7. The heat-assisted magnetic recording heat of claim 4, wherein the surface of the heat sink comprises at least one of rhodium, copper, tungsten, tantalum, iridium, platinum, ruthenium, nickel, or iron.

8. The heat-assisted magnetic recording head of claim 1,
   wherein the interface is a first interface,
   wherein the near-field transducer further comprises a middle disk,
   wherein the heat sink and the middle disk are coupled to each other at a second interface which is substantially orthogonal to the air-bearing surface, and
   wherein the second interface comprises a surface of the middle disk and a second surface of the heat sink.

9. The heat-assisted magnetic recording head of claim 8,
   wherein the middle disk and the near-field emitter are coupled to each other at a third interface which is substantially orthogonal to the air-bearing surface,
   wherein the surface of the middle disk is a first surface of the middle disk,
   wherein the surface of the near-field emitter is a first surface of the near-field emitter, and
   wherein the third interface comprises a second surface of the near-field emitter and a second surface of the middle disk.

10. The heat-assisted magnetic recording head of claim 8, wherein the surface of the heat sink comprises at least one of rhodium, copper, tungsten, tantalum, iridium, platinum, ruthenium, nickel, or iron.

11. The heat-assisted magnetic recording head of claim 1 comprising a waveguide,
    wherein the interface is a first interface,
    wherein the plasmonic disk and the waveguide are coupled to each other at a second interface which is substantially orthogonal to the air-bearing surface,
    wherein the surface of the plasmonic disk is a first surface of the plasmonic disk, and
    wherein the interface comprises a surface of the waveguide and a second surface of the plasmonic disk.

12. The heat-assisted magnetic recording head of claim 1, wherein the at least one of rhodium, copper, tungsten, tantalum, iridium, platinum, ruthenium, nickel, or iron is a primary material that constitutes at least 50 percent of the composition of the heat sink.

13. The heat-assisted magnetic recording head of claim 12, wherein the primary material comprising at least one of rhodium, copper, tungsten, tantalum, iridium, platinum, ruthenium, nickel, or iron is a primary material of an alloy.

14. The heat-assisted magnetic recording head of claim 13, wherein the alloying metal of the alloy comprises rhodium, copper, tungsten, tantalum, iridium, platinum, ruthenium, nickel, bismuth, indium, tin, manganese, holmium, lutetium, praseodymium, scandium, uranium, barium, cesium, dysprosium, europium, rubidium, terbium, gadolinium, samarium, thallium, cadmium, neodymium, lead, hafnium, niobium, erbium, magnesium, palladium, vanadium, zinc, chromium, iron, lithium, sodium, strontium, calcium, yttrium, thorium, beryllium, thulium, ytterbium, promethium, neodymium, cobalt, cerium, lanthanum, or combinations thereof.

15. The heat-assisted magnetic recording head of claim 12, wherein the primary material comprising at least one of rhodium, copper, tungsten, tantalum, iridium, platinum, ruthenium, nickel, or iron is a primary material of a composite.

16. The heat-assisted magnetic recording head of claim 15, wherein the composite further comprises a secondary material that are nanoparticles.

17. The heat-assisted magnetic recording head of claim 16, wherein the nanoparticles comprise at least one of yttrium oxide or zinc oxide.

18. A heat-assisted magnetic recording head comprising a near-field transducer comprising:
    a waveguide;
    a plasmonic disk;
    a near-field emitter configured to heat a surface of a magnetic disk; and
    a heat sink comprising at least one of rhodium, copper, tungsten, tantalum, iridium, platinum, ruthenium, nickel, or iron,
    wherein the plasmonic disk is disposed between the waveguide and the near-field emitter in a down-track dimension of the heat-assisted magnetic recording head,
    wherein the near-field emitter is disposed between the plasmonic disk and the heat sink in the down-track dimension of the heat-assisted magnetic recording head,
    wherein the plasmonic disk and the waveguide are coupled to each other at a first interface comprising a surface of the waveguide and a first surface of the plasmonic disk, wherein the near-field emitter and the plasmonic disk are coupled to each other at a second interface comprising a second surface of the plasmonic disk and a first of the near-field emitter, and wherein the middle disk and the near-field emitter are coupled to each other at a third interface comprising a second surface of the near-field emitter and a surface of the middle disk.

19. A heat-assisted magnetic recording head comprising a near-field transducer comprising:

a plasmonic disk;

a near-field emitter configured to heat a surface of a magnetic disk;

a middle disk; and a heat sink comprising at least one of rhodium, copper, tungsten, tantalum, iridium, platinum, ruthenium, nickel, or iron, wherein the near-field emitter is disposed between the plasmonic disk and the middle disk in a down-track dimension of the heat-assisted magnetic recording head, wherein the middle disk is disposed between the near-field emitter and the heat sink in the down-track dimension of the heat-assisted magnetic recording head, wherein the near-field emitter and the plasmonic disk are coupled to each other at a first interface comprising a surface of the plasmonic disk and a first surface of the near-field emitter, wherein the middle disk and the near-field emitter are couple to each other at a second interface comprising a second surface of the near-field emitter and a first surface of the middle disk, and wherein the heat sink and the middle disk are coupled to each other at a third interface comprising a second surface of the middle disk and a surface of the heat sink.

\* \* \* \* \*